Patented Jan. 23, 1923.                                                                 1,442,963

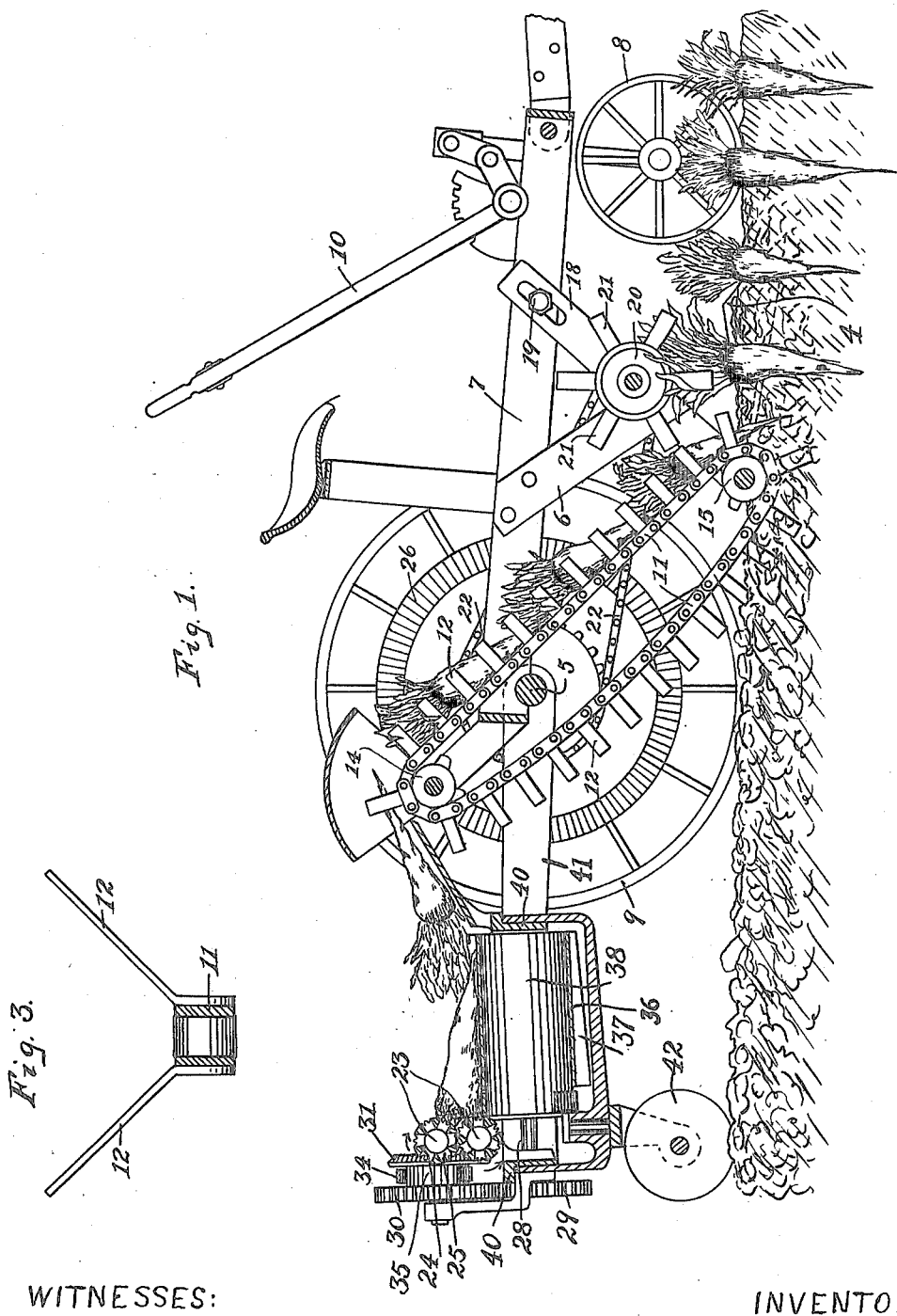

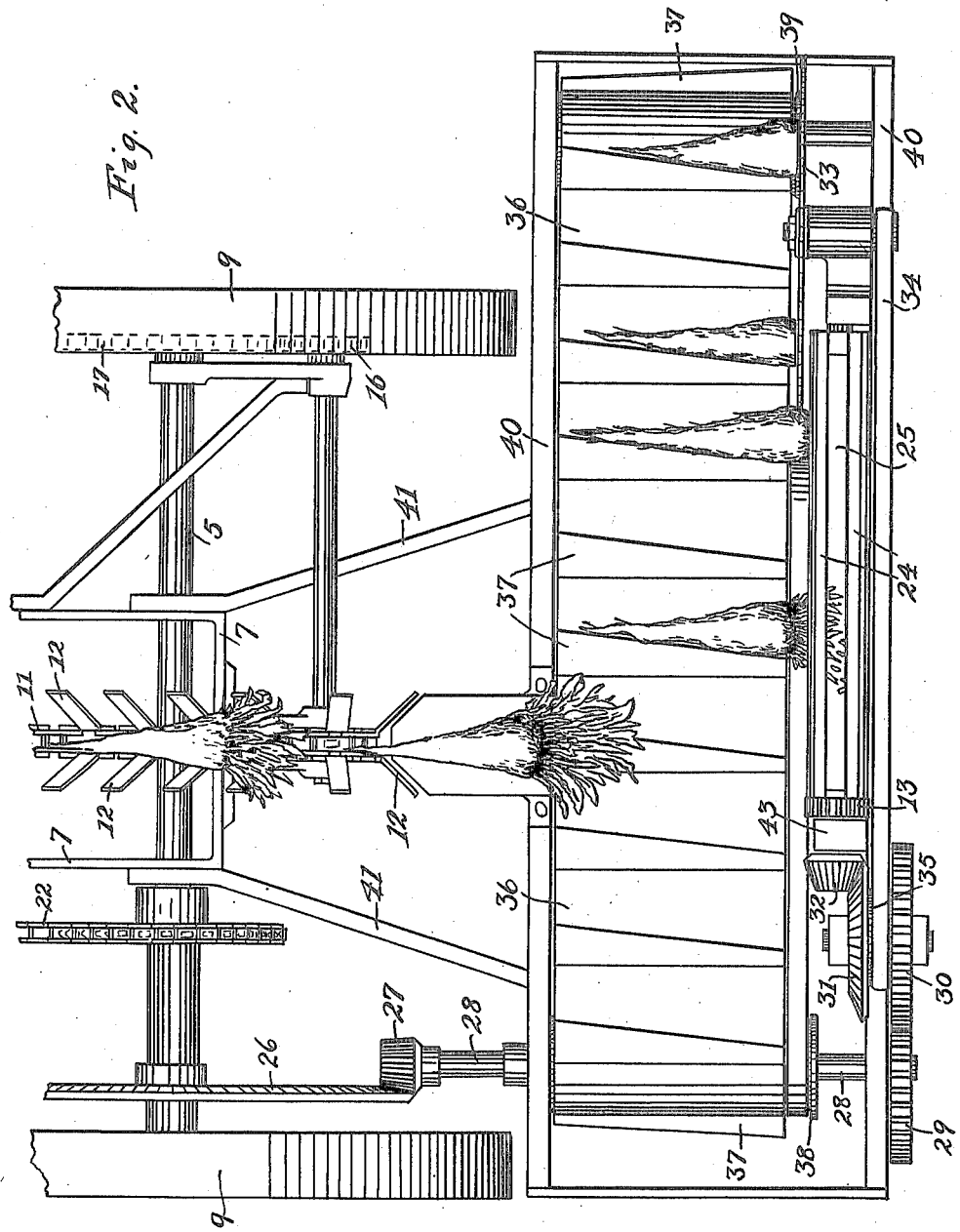

UNITED STATES PATENT OFFICE.

THOMAS E. MOORE, OF GRAND JUNCTION, COLORADO.

BEET-HARVESTING MACHINE.

Application filed September 17, 1920, Serial No. 410,997. Renewed September 25, 1922. Serial No. 590,537.

*To all whom it may concern:*

Be it known that I, THOMAS E. MOORE, a citizen of the United States, residing at Grand Junction, in the county of Mesa and State of Colorado, have invented a new and useful Beet-Harvesting Machine, of which the following is a specification.

My invention relates to improvements in machines for performing the entire operation of harvesting the beets, including digging them from the ground, cutting off the foliage and leaf stems and cutting of the crown at the required point and thereafter depositing the beets to one side of the row being harvested, either singly or in suitable piles on the ground; and the special object of the present invention is to provide automatic topping mechanism for first removing substantially all of the foliage and leaf stems from the beets and then cutting the crowns therefrom at a suitable and substantially uniform distance below the top of the beet root.

I attain this object by means of the mechanism shown in the accompanying two sheets of drawings in which:

Figure 1 is side view of the complete machine shown substantially in section. Figure 2 is a top-plan view of the rear part of the machine showing more clearly the topping mechanism. Figure 3, is an end view of one of the beet elevator links.

Similar reference characters refer to similar parts in each of the views.

A beet plow of some usual type of construction serves to loosen and partly pull the beets from the ground in the usual manner by means of the twin shares 4, one on each side of the row of beets. The plow shares 4 are secured to the side members 6 of a suitable rectangular frame 7, which is suppported at a suitable height from the ground by means of the pivoted truck wheel 8 at the front and drive wheels 9 at the rear. The front end of the frame may be raised or lowered as desired by means of any usual type of lifting mechanism, such as the ratchet lever 10 shown, thereby adjusting the shares 4 to the required depth in the soil.

The inclined endless link-belt 11 is provided to pull the beets entirely out of the ground after they have been loosened by the plow shares and it then elevates and delivers them to the topping mechanism whereby the leaves and leaf stems are entirely removed and the crowns are automatically cut from the beets. The conveyor links are provided with side arms 12 set at an angle of approximately 45 degrees, as shown in Figure 3, forming when assembled an endless V-shaped conveyor. This conveyor 11 is carried on two sprockets 14 and 15. The upper one is driven by gears 16 and 17, the latter being secured to and rotated by one of the drive wheels 9. The lower idler sprocket 15 is mounted in bearings at the lower ends of the arms 18 which have a slotted connection to the main frame at 19 whereby it may be raised or lowered relative to the shares 4. The ratio of these driving gears should be such that the longitudinal movement of the conveyor will be sufficiently rapid to pull and elevate all of the beets in the row, so as to, prevent any bunching or clogging of the beets in the mechanism. For the purpose of assisting in the pulling of the beets and properly placing them on the conveyor an auxiliary wheel 20 is provided, having a series of radial arms, 21, somewhat similar to the angled arms 12 on the endless link-belt 11. The wheel 20 is continuously rotated in the same direction as the drive wheel 9 by means of a link belt 22 or other equivalent mechanism. It is essential in properly harvesting sugar beets for use in the manufacture of sugar that all the crowns, which is that part of the top of the beet from which the leaf stems grow, be entirely cut off from the beet root proper, the operation being known as "topping". It is further desirable in the interest of maximum tonnage of merchantable beets that none of the beet roots proper be cut away in topping.

It has been attempted heretofore in harvesting sugar beets, to top them while still in the ground. But since the tops of beets vary considerably with reference to the surface of the ground, such topping has not been found practical or economical. Usually, however, the leafy tops only are first cut from the beets while still in the ground, at a sufficient height to leave the crowns all intact. When the subsequent operation of topping is done by suitable mechanism the varying lengths of the leaf stems remaining on the beets have heretofore made automatic mechanical topping inaccurate and wasteful and therefore commercially impractical.

It is not necessary, with my machine, to cut any part of the foliage or leaf stem from the beets before pulling them from the ground, although the foliage may be cut and raked up and removed before pulling if desired. In the drawings the beets are shown as being removed from the ground and delivered to the topping mechanism with the entire foliage remaining on them.

For the purpose of removing all this foliage and the leaf stems close to the beet top or crown, in order that a substantially uniform depth of crown may be automatically cut from the top end of all of the beets, the topping rolls 23 are provided. Two of these topping rolls are used, each having a series of uniformly spaced longitudinal tongues 24 and grooves 25, which are arranged to mesh similar to the teeth of gear wheels, as is clearly shown in Figure 1. The central part of these rolls is preferably cut entirely away except for a short distance at each end, in order to prevent clogging by the foliage and leaf stems. These rolls are mounted in suitable bearings and are provided with spur gears 13 at one end whereby they are caused to rotate in opposite directions, with the longitudinal tongues and grooves properly spaced as shown. The topping rolls 23 are caused to rotate in the direction of the arrows, being driven from one of the large drive wheels by means of the large bevel gear wheels 26 secured thereto by means of the bevel pinion 27, shaft 28, spur gears 29 and 30, and bevel gears 31 and 32.

A rapidly revolving cutter 33, being preferably a fine tooth circular saw, is provided for cutting the crowns from the beets after the foliage and leaf stems have been removed by the topping rolls. This cutter is driven by a suitable belt 34, from a pulley 35.

An endless conveyor-belt 36, having suitable lugs or slats 37, secured thereto which form spaced compartments into which the beets are delivered from the beet elevating mechanism and thus carried laterally the entire length of the topping rolls to the revolving cutter 33.

The conveyor belt 36, passes around two drums 38 and 39 which are located near the ends of the rectangular frame 41. The driving drum 38 is secured to the shaft 28, whereby it is caused to rotate and move the belt towards the right. When the beets reach the right hand end of the conveyor belt they drop directly to the ground or into a suitable receptacle from which they may be dumped into piles on the ground at suitable intervals. A suitable receptacle may be placed below the frame in the proper position to receive the severed beet crowns when it is desired to save them for feeding stock.

The entire topping mechanism is supported by a suitable rectangular frame 40 which is pivotally connected to the axle 5 of the drive wheels by the arms 41, and it is carried by a caster wheel or wheels 42.

I am aware that it is not new to use rotary cutters to cut the crowns from beets while they are moved laterally by means of suitable conveying mechanism, but I believe I am the first to provide means whereby all of the foliage and leaf stems may be automatically stripped or cut close to the crowns, thereby presenting all of the beets to the action of the cutter in such a manner that substantially the same depth of crown will be cut off.

What I claim as my invention is:

1. The combination in a beet harvesting machine of a laterally moving conveyor, topping rolls adjacent to said conveyor adapted to remove the leaves and stems from the top of the beet and means for cutting the crowns from the beets at substantially a uniform distance below the tops of said crowns.

2. The combination in a beet harvesting machine of a laterally moving conveyor provided with transverse compartments to keep the beets suitably spaced on said conveyor, topping rolls adjacent to said conveyor adapted to remove the leaves and stems from the top of the beet, and means for cutting the crowns from the beets at substantially a uniform distance below the tops of said crowns.

3. The combination in a beet harvesting machine of a laterally moving conveyor, topping rolls adjacent to said conveyor adapted to remove the leaves and stems from the top of the beet, a rotating cutter suitably spaced from the topping rolls to cut the crowns from the beets at a proper and uniform distance below the tops of said crowns.

4. The combination in a beet harvesting machine of topping rolls adapted to remove the leaves and stems from the tops of the beets, means for conveying the beets longitudinally with said rolls with crowns adjacent thereto, and means for cutting the crowns from the beets at substantially a uniform distance below the tops of said crowns.

THOMAS E. MOORE.

Witnesses:
B. M. APPLEGATE,
A. J. LOCKWOOD.